July 30, 1963  A. D. SINDEN  3,099,349
ECCENTRIC DRIVE FOR VIBRATING CONVEYOR
Filed Dec. 6, 1960  3 Sheets-Sheet 1
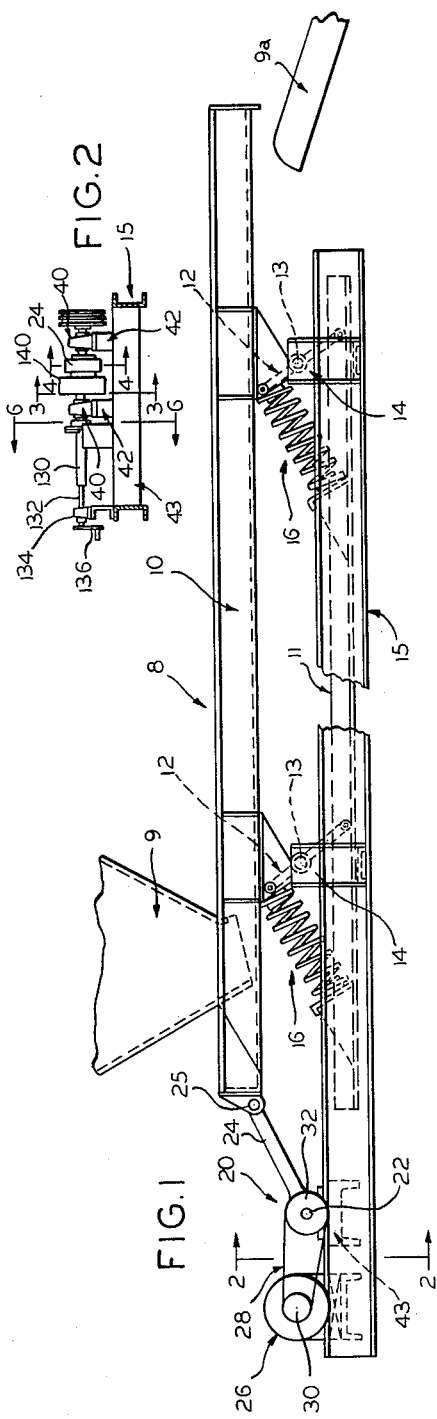
INVENTOR.
ALFRED D. SINDEN
BY
Mann, Brown & McWilliams
ATTORNEYS

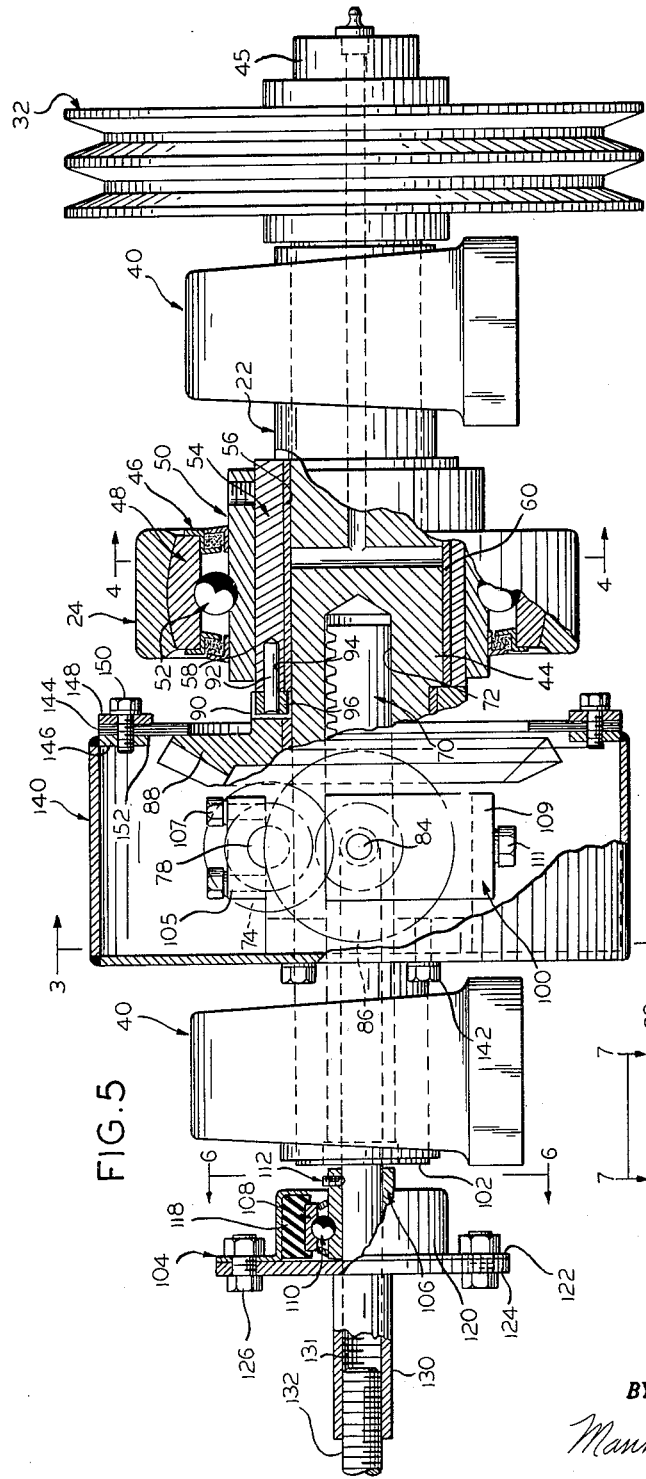

July 30, 1963 A. D. SINDEN 3,099,349
ECCENTRIC DRIVE FOR VIBRATING CONVEYOR
Filed Dec. 6, 1960 3 Sheets-Sheet 3
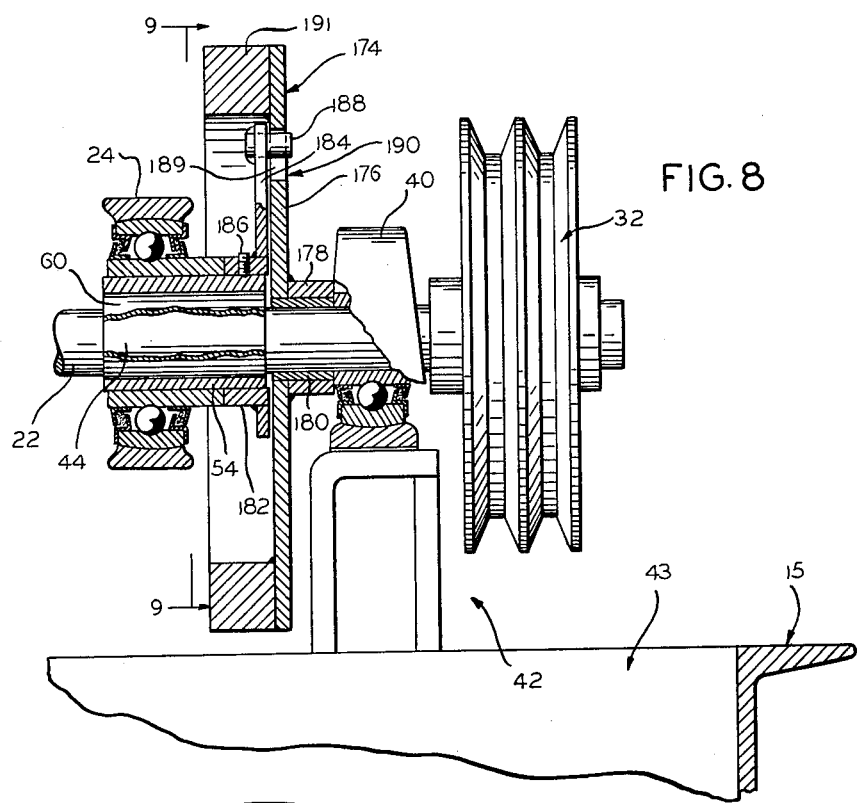
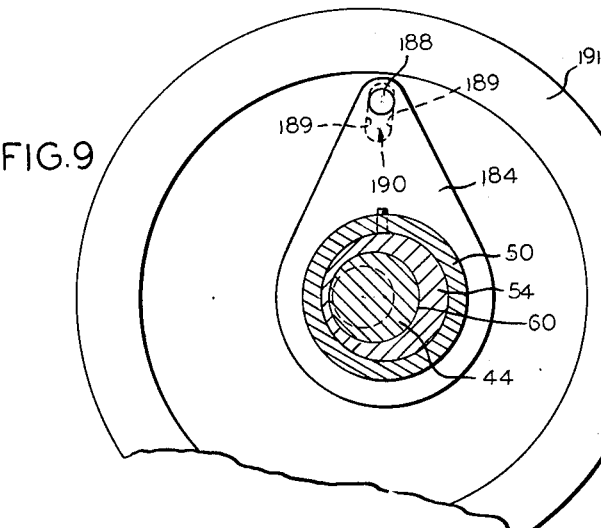
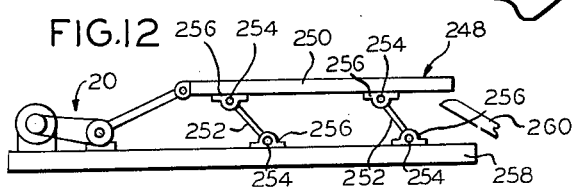
INVENTOR.
ALFRED D. SINDEN
BY
Mann, Brown & McWilliams
ATTORNEYS United States Patent Office 3,099,349
Patented July 30, 1963

3,099,349
ECCENTRIC DRIVE FOR VIBRATING CONVEYOR
Alfred D. Sinden, Aurora, Ill., assignor to Stephens-Adamson Mfg. Co., a corporation of Illinois
Filed Dec. 6, 1960, Ser. No. 74,061
4 Claims. (Cl. 198—220)

My invention relates to vibrating conveyors, and more particularly, to vibrating conveyors of the type having positive, mechanically induced, vibration, as distinguished from those in which the vibration is electrically induced or is caused by reactions of unbalanced weights. Specifically, the invention relates to a drive apparatus or mechanism of the eccentric type for mechanically inducing vibration of, for instance, a natural frequency conveyor, which drive apparatus or mechanism permits adjustment of the amplitude of vibration either while the conveyor is operating or while it is at rest.

Apparatus of the type to which my invention generally relates is disclosed in Patent No. 2,664,995, granted January 5, 1954, to Elmer J. Renner. This patent discloses a natural frequency vibrator comprising a conveying trough or tray element and a counterbalance element pivotally connected together by a parallel linkage having its components respectively swinging about medially disposed supporting fulcra, with harmonic spring elements interposed between the trough and counterbalance, and mechanism for mechanically inducing vibration of either of the conveyor elements at a rate on the order of the natural frequency of the spring elements. The drive mechanism comprises a rotating shaft having an eccentric portion that drives a connecting rod or arm which is operatively connected to either the trough or counterbalance element, with the result that the rotating shaft eccentric portion through the connecting rod or arm forces the trough and counterbalance elements apart and together during each revolution of the eccentric drive shaft. This arrangement gives the desired vibrating movement to the trough and counterbalance (which also may be a conveying trough), and does so with a minimum of power input, since full advantage is taken of the energy that is returned by the springs at the start of each stroke of the conveyor.

The natural frequency vibrator apparatus of said Renner patent is merely one example of many forms of vibrating conveyors known to the art, though this general type of apparatus basically contemplates a conveyor element supported by rocker arms or the like, and a suitable vibration inducing apparatus for vibrating the conveyor at a rate suitable for providing proper conveying action. However, conveyors of this general class may all be conveniently actuated by an eccentric drive of the type diagrammatically illustrated in said Renner patent. My invention has to do with improvements in this drive.

Experience has taught that it is desirable to be able to adjust the amplitude of vibration of vibrating conveyors so as to permit variation of the feed rate to accommodate varying requirements. This is essential as the same conveyor may be used for conveying different types of discrete material, and the day to day feed rate requirements will vary even for identical materials. Furthermore, changes in atmospheric conditions are known to affect the cohesiveness of the particles to be conveyed, and even where the conveyor is to handle only one material of uniform particle size, day to day adjustments in the amplitude of vibration should be possible to obtain and maintain a constant conveyor feed rate, should this be desirable under the circumstances.

Although the prior art is replete with examples of devices for producing reciprocating motion with variable amplitude, so far as I am aware, none of the rotatable eccentric type have been commercially developed which are really suitable for actuating conveyors of the type discussed above. Undoubtedly the reason for this lies in the problems peculiar to the vibrating conveyor art.

Thus, experience has taught that to provide a proper conveying action, the frequency of vibration of vibrating conveyors should be in the general range of between 600 and 1,200 cycles per minute at amplitudes under one inch. With regard to vibrating at such vibration frequencies, the reactions produced on the vibration inducing means by inertia are substantial, as the direction of force on the driving arm or rod that is actuated by the eccentric will be reversed every half revolution of the drive shaft. If the drive mechanism should contain any appreciable backlash that would be taken up upon the reversal of forces in the connecting rod or arm, the noise and wear on the drive would render the whole conveyor mechanically and economically unsuitable for its designed purposes.

In natural frequency vibrating conveyors, these inertia forces are balanced by the spring forces in every position and thus the only forces transmitted by the driving arm are those necessary to overcome machine friction and the weight and friction of the conveyed material. Even so, the driving arm forces can be quite sizable and therefore a similar backlash problem at the vibration rates mentioned is presented.

Conventional eccentric drive arrangements frequently provide for adjustment of the eccentric by interposing an eccentrically bored sleeve between the driving and driven elements, and arranging the sleeve for rotation with respect to one of these elements by employing gears, levers, screws and the like that have backlash characteristics and are customarily so arranged that they will have transmitted directly thereto all or part of the reversing forces that would be occasioned by rotation of the eccentric. This causes a slight forward or rearward movement in the eccentric drive for each half revolution, to the extent permitted by the backlash. If such devices were to be employed to provide a variable eccentric for the drive shown in the Renner patent at the vibration rates indicated, a pounding action would result that has been found to quickly fatigue and cause failure in the materials forming the drive elements involved.

It is a principal object of this invention to provide a variable eccentric drive, of the type indicated, for vibrating conveyors in which this objectionable backlash is eliminated by insuring that the reactions transmitted by the driven member are transmitted entirely into the eccentric shaft to the exclusion of the mechanism for varying the eccentricity.

Another problem confronting workers in this art is the phenomenon known as fretting corrosion. This type of corrosion occurs commonly in steel or ferrous alloys (from which eccentric drives and their components would ordinarily be made), and appears to be caused, in the case of ferrous materials, by the iron in the material that forms the contacting surfaces of the different drive elements becoming oxidized. The conditions causing the oxidation are entirely different from those causing ordinary corrosion and, in fact, fretting corrosion ordinarily takes place under conditions where ordinary rusting, as from moisture or corrosive gases, would be impossible.

In general, fretting corrosion occurs where two surfaces are in contact under a pressure which varies over a wide range at high frequency, even though the two surfaces are covered with grease. The result is an attrition of the surfaces on a molecular scale, which greatly reduces fatigue strength and may result in a locking of the two surfaces together due to the accumulation of the products of corrosion between the two. Although oxidation products are usually found between the two surfaces, indicating the presence of a chemical action, vibration or rapid reversal of forces appears to also be an essential factor as no such surface deterioration occurs if the machine remains at rest. It would appear that vibration of alternating stresses beyond certain limits may give rise to a micromovement between the two surfaces, even though no gross movement occurs, which causes slippage, alternating in direction and thus leading to the attrition on a molecular scale.

It may be pointed out that this phenomenon is not yet well understood and there is disagreement among investigators as to the actual chemistry involved. However, the conditions under which it occurs are predictable and a considerable amount of data has been recorded regarding rapidity of corrosion as related to nature of surfaces, type of lubricant, range and speed of pressure changes, and the like. A discussion of this phenomenon may be found in Dictionary of Metallography by R. T. Rolfe at page 109, published by Chemical Publishing Co., Inc., of New York, New York (2nd ed., 1955), and this is incorporated herein by this reference.

Since the eccentric drive of commercial embodiments of the apparatus covered by said Renner patent involves a connecting rod or arm actuated by a rotating shaft eccentric portion it will be evident that if the drive of this patent were to be made variable by interposing an eccentrically bored sleeve between the shaft eccentric portion and the connecting rod or arm, such drive arrangement would be susceptible to this objectionable fretting corrosion at the contacting surfaces of the shaft eccentric portion and the sleeve. Assuming the general vibration rate range already mentioned, it will be apparent that the pressure between these two surfaces would change from zero to a fair sized maximum and back to zero at a rate on the order of 850 times a minute. Tests of such drive arrangements have shown that iron oxide forms quite rapidly between the two contacting surfaces when they are formed of ferrous alloys (as is customary), and as a result of the progressing frettage, the turning of the eccentric sleeve for purposes of varying the amplitude of vibration becomes more and more difficult. For example, a vibrator drive shaft for vibrators of the type disclosed in said Renner patent, modified as indicated, and formed from ordinary steel will become corroded to the point where its stroke cannot be changed in an operating period of less than 200 hours, thus indicating that products of corrosion have accumulated between the shaft eccentric portion and the sleeve to the extent that they jam the two against relative movement.

A further important object of this invention is to provide an eccentric drive for vibrating conveyors which is arranged to preclude fretting corrosion.

Other objects of the invention are to provide a variable eccentric drive mechanism vibrating conveyor in which the eccentric control or adjustment mechanism is arranged to permit the drive shaft bearings to be disposed on either side of and closely adjacent the eccentric portion of the drive shaft to provide maximum ruggedness with maximum compactness; to provide a variable eccentric drive in which the eccentric drive control or adjustment mechanism is fully housed against dust or other operating impurities; and to provide a vibrating conveyor drive arrangement that is economical of manufacture, that is convenient to install and use, and that may be readily applied to a wide variety of existing vibrating conveyor installations.

Further and other uses and advantages will become obvious or become apparent from a consideration of the following detailed description and the application drawings.

In the drawings:

FIGURE 1 is a side elevational view diagrammatically illustrating one of the forms of the natural frequency vibrating conveyor shown in said Renner patent used as a vibrating discharge gate from a hopper, this said conveyor having a variable eccentric vibration inducing apparatus or mechanism applied thereto in accordance with my invention;

FIGURE 2 is a small scale cross-sectional view substantially along line 2—2 of FIGURE 1;

FIGURE 3 is a view substantially along line 3—3 of FIGURES 2 and 5;

FIGURE 4 is a cross-sectional view substantially along line 4—4 of FIGURES 2 and 5;

FIGURE 5 is a view similar to that of FIGURE 2, but on an enlarged scale with parts being broken away for clarity of illustration;

FIGURE 6 is a fragmental sectional view substantially along line 6—6 of FIGURES 2 and 5;

FIGURE 7 is a fragmental plan view substantially along line 7—7 of FIGURE 6;

FIGURE 8 is a fragmental view similar to that of FIGURE 5, but illustrating a modified form of the invention;

FIGURE 9 is a diagrammatic fragmental cross-sectional view substantially along line 9—9 of FIGURE 8;

FIGURE 10 is a fragmental view similar to that of FIGURE 5 and illustrating a further modified form of the invention;

FIGURE 11 is a fragmental sectional view substantially along line 11—11 of FIGURE 10; and FIGURE 12 is a small scale side elevational view similar to that of FIGURE 1 showing a drive of the type indicated in FIGURE 1 applied to a vibrating conveyor that is not of the natural frequency type.

However, it should be understood that the illustrated embodiments of the invention are merely examples of how my invention is applicable to the vibrating conveyor art, they being provided for purposes of complying with 35 U.S.C. 112, and the appended claims are to be construed as broadly as the prior art permits.

Referring to FIGURE 1, reference numeral 8 generally indicates one of the forms of natural frequency vibrating conveyors disclosed in said Renner Patent 2,664,995 employed to discharge material from a hopper 9 and convey it to a chute 9a. The conveyor apparatus 8 comprises a tray or trough 10 and counterbalance 11 connected together by four links or levers 12 pivoted at opposite ends to the trough and counterbalance and fulcrumed between them at 13 in suitable bearings supported by brackets 14 fixed to base frame 15.

The tray or trough and the counterbalance (which may also be a tray or trough) are connected by appropriate spring elements (here shown as helical springs 16) aligned longitudinally with the tray and counterbalance and inclined with respect thereto.

This arrangement gives the tray and counterbalance parallel motion in moving toward and away from each other while the levers swing on the fulcra under the impetus provided by the rotating eccentric drive apparatus indicated at 20, which comprises a shaft 22 journalled in suitable bearings and including an eccentric portion (not shown in FIGURE 1) which is engaged by one end of the connecting rod or drive arm 24 that is operatively connected to either the tray or trough 10 or the counterbalance 11, as by pin 25. The shaft 20 is rotated by a suitable motor 26 through an appropriate pulley belt 28 and suitable pulleys 30 and 32.

As the shaft 22 rotates, the balanced tray and counterbalance are forced apart and then together at each revolution of the shaft, which movements are resisted by the springs 16 in both directions. The timing of the drive 20 is arranged to provide a vibration rate substantially equivalent to the natural period of vibration of the springs, and this develops a harmonic action in the end portions of the springs leaving the intermediate or middle portion of the springs neutral as indicated in the Renner patent. Each time the throw of the shaft eccentric moves, for instance, the tray, the springs 16 are compressed or extended with harmonic motion, which tends to reverse itself in time with the revolution of the eccentric. The springs 16 are designed to have a natural period of vibration in the vibration rate range already mentioned.

The apparatus 20 when arranged in accordance with this invention is shown in FIGURES 2-11 although the reference numerals already employed have been retained where applicable.

In connection with the embodiment of FIGURES 2-7, it will be seen that the shaft 22 is journalled in suitable bearings 40 that may be of the ball bearing type disclosed in Glavan Patent 2,952,898. The bearing units 40 are fixed in any suitable manner, for instance, to a suitable platform 42 supported in any suitable manner by the frame 15, as on channel 43. The pulley 32 may be keyed in any suitable manner on one end 45 of the shaft 22.

In the specific form illustrated in these drawings, the connecting rod or arm 24 is journalled on the eccentric portion 44 of shaft 22 by an appropriate form of ball bearing unit 46 which may conveniently include an outer race 48 an inner race 50, and a plurality of bearing balls 52 interposed between the two races, all of which are assembled in any known manner. In the showing of FIGURE 4, the eccentric portion 44 is sectioned differently from shaft 22 to better distinguish the two, but ordinarily eccentric portion 44 is formed directly on shaft 22.

In accordance with this invention, the throw of the eccentric is made variable by interposing between the connecting rod or throw arm 24 and the shaft eccentric portion 44, a sleeve 54 having its bore 56 eccentrically disposed with respect to its rim 58; furthermore, an eccentric control or adjustment mechanism or apparatus is employed for rotating the eccentric sleeve 54 with respect to the shaft eccentric portion 44 on which it is journalled to relatively position the shaft eccentric portion and sleeve to provide the amount of throw, and corresponding vibration amplitude, desired.

This relation of parts is shown in FIGURE 4 wherein the axis of rotation of shaft 22 is shown by reference character A, the central axis of the shaft eccentric portion 44 is indicated by reference character B, which axis coincides with the axis of the bore 56 of sleeve 54, and the axis of the rim 58 of the eccentric sleeve is indicated by reference character C.

In the showing of FIGURE 4, reference character D designates the force acting through the connecting rod or throw arm 24, reference character E indicates the distance between points B and C (that is, the eccentricity between the bore and rim of sleeve 54), reference character F indicates the frictional force between the shaft eccentric portion 44 and sleeve 54, and R is the radius of the shaft eccentric portion 44.

When motor 26 is operating to rotate the shaft 22, the shaft eccentric portion 44 through sleeve 54 applies thrusts in opposite directions on the operating rod or control arm 24, with the result that the force represented by character D will operate longitudinally of the connecting rod or throw arm 24 to induce vibration of the conveyor. Since the force D, regardless of its direction, acts on the shaft eccentric portion 44 through a lever arm equivalent to the distance E, the sleeve 54 is subjected to a turning moment with respect to the shaft eccentric portion 44 which tends to be resisted by the frictional moment represented by the force F times the radius R.

In accordance with my invention, the eccentricity of the bore 56 of sleeve 54 with respect to its rim 58, and the radius of the shaft eccentric portion 44 are related to insure that the frictional moment F times R is substantially equal to or exceeds the turning moment D times E. When this relationship obtains, a self locking condition exists with regard to the journaling of sleeve 54 on shaft eccentric portion 44, and so long as these relationships are observed, there will be no movement of the sleeve 54 with respect to the shaft eccentric portion 44 regardless of the thrusts imposed on the connecting rod or throw arm 24.

Since the frictional force F is equal to the force D times the coefficient of friction between the shaft portion 44 and sleeve 54, this self locking condition will exist if the ratio of the eccentricity of the bore of the sleeve 54 with respect to its rim and the radius of the shaft eccentric portion $(E/R)$ are equal to or less than this coefficient of friction. Thus, if, following the principles of conventional design as to selection of materials, the shaft and its eccentric portion 22 were formed from steel and the sleeve 54 were formed from a suitable metal and coated with grease, the coefficient of static friction between the sleeve and the shaft eccentric portion would not be less than .1. Therefore, the self locking condition, contemplated by this invention would exist so long as the radius of the shaft eccentric portion is at least ten times as long as the eccentricity E of sleeve 54.

Further in accordance with this invention, to eliminate the aforementioned fretting corrosion problem, the shaft eccentric portion 44 is provided with a liner 60 formed from a material that is resistant to fretting corrosion, and the sleeve 54 is formed from a like material. In a preferred arrangement, the sleeve 54 and the sleeve or liner 60 are formed from bronze, as this material has been shown to avoid the fretting corrosion phenomenon explained above, which will occur even though the above mentioned ratio is employed (apparently due to the fact that micro-movement occurs between the sleeve 54 and shaft portion 44 in spite of the fact that observance of my ratio will eliminate gross or observable movement). While bronze is presently preferred, it is believed that any material that is not subject to ordinary corrosion or frettage would be satisfactory and examples are plastics such as nylon and Teflon (polytetrafluoroethylene), and hard rubber. While experience has shown that metals satisfactory for this purpose will be of the non-ferrous type, metals such as magnesium and aluminum should be avoided because of their tendency to form surface films that will be subject to attrition under the operating conditions of this invention.

It may be added that with the bronze on bronze combination, lubrication is not essential to continued free turning of the sleeve with respect to the shaft eccentric portion.

In this embodiment of the invention, the sleeve 54 is turned with respect to the shaft eccentric portion 44 by a rack member 70 received in a bore 72 formed along the axis of shaft 22. The rack is mounted for sliding movement along the axis of shaft 22 and meshes with an appropriate gear 74 (see FIGURE 3) keyed to a shaft 78 which also has keyed thereto a gear 80 that meshes with gear 82 keyed to a shaft 84. Shaft 84 also has keyed thereto gear 86 which meshes with bevel gear 88 that is journalled on shaft 22 and is formed with an elongate slot 90 (see FIGURE 5) in which is received a pin 92 that is fixed in any suitable manner in a bore 94 formed in the sleeve 54. In the form of FIGURE 5, pin 92 carries a quadrilateral shaped slider element 96 that engages the sides of slot 90, with the slot 90 being disposed in a plane that includes the axis of shaft 22 and being provided to accommodate the movement of pin 92 relative to gear 88, radially of shaft 22 on movement of sleeve 54 with respect to shaft portion 44, that is inherent in the eccentric mounting of sleeve 54 on shaft portion 44.

The gears 74, 80, 82 and 86 and their shafts 78 and 84 are secured in any suitable manner to an appropriate frame generally indicated by reference numeral 100, somewhat as broadly suggested by the drawings, and the frame 100 is keyed to the shaft 22 for rotation therewith by screw 101 locked in place by lock nut 103. Shaft 78 is journalled in place by cap 105 held in place by bolts 107, while one end of shaft 84 is journalled in frame 100 and the other end in bracket 109 secured to the frame 100 by bolts 111.

The rack member 70 extends outwardly of the end 102 of the shaft and is journalled in a flange type ball bearing unit 104 including inner race 106, outer race 108 and ball bearings 110 operatively mounted in any suitable manner between these races, with the inner race keyed to the rack member by appropriate set screw 112.

The specific flange type bearing unit 104 shown includes a hard rubber liner 118 between its outer race 106 and the housing member 120; housing member 120 is a cup-shaped member that has its rim 122 affixed to base 124 by appropriate bolts 126 and as indicated in FIGURE 2, a tubular member 130 is affixed to the base 124 and is internally threaded as at 131 to receive screw 132 journalled in an appropriate bearing unit 134 (see FIGURE 2) mounted on the conveyor frame 15 and actuated by handle 136. Bearing unit 104 may be similar to units 40.

In the embodiment of FIGURES 2–7, the gearing carried by frame 100 is enclosed in protective housing 140, which is affixed to the frame 100 by appropriate bolts 142 and carries an annular resilient disc 144 which bears against the back of gear 88 to seal off the space within the housing 140. The annular disc 144 is held in place by being gripped between the annular housing rim portion 146 and annular plate 148 secured together by appropriate bolts 150. Obviously, the housing rim or wall 146 is open at 152 to permit it to be received over the gear 88.

As indicated in FIGURES 6 and 7, the flange type bearing unit 104 is slidably associated with a scale 160 carried on a suitable support 162 and cooperating with a projecting flange 164 forming a part of bearing unit base 124 to indicate the amount of throw provided by the eccentric drive to prevent rotation of bearing unit 104.

To set the drive 20 of FIGURES 2–7, regardless of whether the shaft 22 is rotating or at rest, one merely turns handle 136 to position the flange 164 on the point of the scale 160 that indicates the amount of throw desired (or required by the condition of the material being conveyed). As handle 136 is rotated, the tubular member 130 and consequently rack member 70 are moved longitudinally of the axis of shaft 22 (due to the screw threaded engagement between screw 132 and tube 130, and the keying of inner race 106 with member 70 by set screw 112), and this rotates gear 88 and consequently sleeve 54, with respect to shaft 22, through the gearing carried by the frame 100.

While the self locking eccentric sleeve adjusting arrangement of FIGURES 2–7 is preferred, instances will occur where the desired E over R ratio is not permissible because of specific design requirements. For instance, under certain conditions, the maximum amplitude needed for adequate feed rate may be considerably in excess of that which considered with the eccentric shaft diameter would provide the desired self locking ratio. In such instances, backlash movement in the eccentric control mechanism of FIGURES 2–7 is prevented by employing the arrangement of FIGURES 8 and 9.

As shown in FIGURE 8, the shaft 22, its eccentric portion 44 and the liner 60 carried thereby, the sleeve 54, throw arm or connecting rod 24, and pulley 32 are essentially the same as previously described. The shaft 22 and its bearing 40, which is positioned between the shaft 32 and the shaft eccentric portion 44 are applied in any suitable manner to an appropriate support 42 fixed as desired to the conveyor framing 15. The other bearing 40 as well as the mechanism for positioning eccentric sleeve 54 with respect to the shaft eccentric portion 44 are the same as previously described.

In this embodiment of the invention, the shaft 22 has journalled thereon a fly wheel 174, which may be of any suitable type, but in the form shown comprises disc 176 and collar 178 fixed together as by welding and having press fitted therein a suitable plain bearing 180 which rides on the shaft 22.

The eccentric sleeve 54 and the shaft eccentric portion 44 are made somewhat longer axially of the shaft 22 and annular member 182, having an arm 184 fixed thereto, is keyed to the sleeve 54 by any appropriate means, such as set screw 186. The arm 184 has fixed to its outer end a pin 188 that rides in an elongated slot 190 formed in the fly wheel disc 174, and has sliding contact with the sides 189 thereof. The elongation of slot 190 should be sufficient to accommodate the combined eccentricity of the shaft portion 44 and sleeve 54.

The fly wheel disc 174 has fixed to its rim the annular reinforcing member 191 for inertia purposes.

In operation, as the shaft eccentric portion 44 acts on the throw arm or connecting rod 24, the reaction against the eccentric sleeve 54 will have a tendency to rotate the sleeve 54 with respect to the shaft eccentric portion 44, as already described. However, the fly wheel 174 will be rotating at a constant speed with the shaft 22, due to the keying action of the arm 184 and its pin 188; since the shaft 22 ordinarily will rotate in the range between 600 and 1,200 r.p.m., the inertia fly wheel will prevent relative movement between the sleeve 54 and the shaft eccentric portion 44 under reaction forces applied to the sleeve 54 by the throw arm or connecting rod 24.

Since the arm 184 is keyed to the sleeve 54, the fly wheel will rotate with respect to the shaft when the sleeve 54 is adjusted to change the amount of throw provided by the eccentric. The elongation of slot 90 permits this movement.

The embodiment of FIGURES 10 and 11 illustrates a simplification of the gearing of the embodiment of FIGURES 2–7 which effects rotation of the sleeve 54 with respect to shaft 22.

In this embodiment, the frame 100 and the gearing carried thereby (see FIGURE 3) are eliminated and the shaft 22 is provided with an enlarged portion 200 adjacent the shaft eccentric portion 44. The rack member 70a comprises a rod-like element 202 which is notched as at 204 to receive a rack segment 206 having the teeth 208 thereof adapted to mesh with a gear 210 keyed to a shaft 212 journalled in the shaft enlargement 200, as by employing plain bearing 214, and extending crosswise of the longitudinal axis of the shaft 22. Also keyed to the crosswise shaft 212 is a bevel gear 216 that meshes with bevel gear 218 that is fixed to a sleeve 220 which is journalled on the shaft enlargement 200. The sleeve 220 is formed with a notch to receive a quadrilaterally shaped slider element 222 fixed to a pin 224 that is secured in the sleeve 54.

The housing 140 is the same as that shown in FIGURE 5 except that it is fixed in this instance to the shaft enlargement 200. Its disc member 144 (not shown) bears against the face 226 of gear 218.

The rack member 202 extends through the end of the shaft 22 as previously described and is operatively associated with a suitable operating handle in the manner suggested by FIGURE 2.

It will be apparent that the embodiment of FIGURES 10 and 11 operates in substantially the same manner as FIGURES 2–7 since movement of the rack member 202 longitudinally of the axis of shaft 22 effects rotation of gears 210 and 216 as well as 218, which in turn effect rotation of sleeve 54 with respect to the shaft eccentric portion 44.

FIGURE 12 diagrammatically illustrates the principles of this invention applied to a vibrating conveyor 248 that is not of the natural frequency type. In accordance with this invention, the drive 20 of FIGURES 1–7 is employed to actuate trough 250 mounted on suitable rocker arms 252 that may be fixed to shafts 254 journalled in appropriate bearings 256 secured respectively to the trough 250 and to a suitable base structure 258. Base structure 258 conventionally is resiliently mounted, in any convenient manner, at its installation site.

Drive 20 in the form of FIGURE 12 operates conveyor 248 in the vibration range already indicated to feed material from, for instance, a hopper such as that suggested in FIGURE 1 to chute 260.

It will therefore be seen that I have provided, in an eccentric drive for mechanically inducing vibration in vibrating conveyors, a throw adjustment feature which overcomes two serious problems that heretofore have made it impractical to provide for adjusting the throw of an eccentric shaft type vibration inducer.

In the first place, the problem of backlash in the variable eccentric is completely overcome by employing the eccentric sleeve adjustment arrangements of either FIGURES 2–7, 10 and 11, or of FIGURES 8 and 9.

In addition to this, the susceptibility of the eccentric throw mechanisms involved in this invention to fretting corrosion is completely eliminated by making the contacting surfaces of the shaft eccentric portion and the eccentric sleeve from the materials above specified, for instance, bronze.

In any event, the oxidation of the sleeve and shaft eccentric portion contacting surfaces that has occurred previously when these surfaces are formed from ferrous metals is eliminated together with the consequent locking of the sleeve with respect to the sleeve eccentric portion.

Furthermore, the disclosed eccentric sleeve positioning mechanisms are so arranged that they operate through the center of the rotating shaft rather than along the exterior thereof, which permits the shaft support bearings to be placed closely adjacent the shaft eccentric portion and thus be better disposed to resist reactions applied to the shaft. Obviously, if the eccentric sleeve positioning mechanism were arranged exteriorly of the shaft, this would require that the shaft bearings be correspondingly separated to accommodate the needed movement longitudinally of the shaft axis.

While the preferred application of the invention is to balance natural frequency vibrators of the type illustrated in FIGURE 1, it is clear that the invention is applicable to vibrating conveyors in general.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:
1. In a vibrating tray apparatus of the type wherein a tray element and a balancing element are connected by a parallel linkage and resilient means are interposed between said elements and power means including a rotatable shaft having an eccentric portion and a throw arm journalled thereon and connected to one of said elements is operated to induce vibration of said tray element at a vibration rate on the order of the natural frequency of said resilient means, the combination with said throw arm and shaft eccentric portion of an eccentrically bored sleeve member interposed between said arm and portion, with the ratio of the eccentricity of the sleeve member bore to the radius of the shaft eccentric portion being equal to or less than the coefficient of friction between the sleeve member and the shaft portion.

2. In a vibrating tray apparatus of the type wherein a tray element is connected to a support by a parallel linkage and power means including a rotatable shaft having an eccentric portion and a throw arm journalled thereon and operatively connected to said element is operated to induce vibration of said tray element, the combination with said throw arm and shaft eccentric portion of an eccentrically bored sleeve member interposed between said arm and portion, with the ratio of the eccentricity of the sleeve member bore to the radius of the shaft eccentric portion being equal to or less than the coefficient of friction between the sleeve member and the shaft portion.

3. The invention claimed in claim 2 in which the engaging surfaces of said sleeve member and shaft portion are formed from a material that is resistant to frettage.

4. The invention claimed in claim 2 in which the power means is operable to induce vibration of said tray element at a rate in the range of 600 to 1,200 cycles per minute.

References Cited in the file of this patent

UNITED STATES PATENTS

| 698,103 | Christenson | Apr. 22, 1902 |
| 1,170,077 | Lawry | Feb. 1, 1916 |
| 1,693,940 | Robins | Dec. 4, 1928 |
| 1,875,854 | Cooper | Sept. 6, 1932 |

FOREIGN PATENTS

| 583,738 | Germany | Aug. 24, 1933 |